US011691926B2

United States Patent
Niendorf et al.

(10) Patent No.: US 11,691,926 B2
(45) Date of Patent: Jul. 4, 2023

(54) MICROFIBER-REINFORCED HIGH-STRENGTH CONCRETE

(71) Applicant: Universität Kassel, Kassel (DE)

(72) Inventors: Thomas Niendorf, Kassel (DE); Philipp Krooss, Kassel (DE); Bernhard Middendorf, Calden (DE); Alexander Wetzel, Guxhagen (DE); Werner Seim, Kassel (DE); Ekkehard Fehling, Hann. Munden (DE); Hans-Peter Heim, Gütersloh (DE)

(73) Assignee: Universitat Kassel, Kassel (DE)

( * ) Notice: Subject to any disclaimer, the term of this patent is extended or adjusted under 35 U.S.C. 154(b) by 51 days.

(21) Appl. No.: 17/044,924

(22) PCT Filed: Mar. 13, 2019

(86) PCT No.: PCT/DE2019/100225
§ 371 (c)(1),
(2) Date: Oct. 2, 2020

(87) PCT Pub. No.: WO2019/192647
PCT Pub. Date: Oct. 10, 2019

(65) Prior Publication Data
US 2021/0155556 A1    May 27, 2021

(30) Foreign Application Priority Data
Apr. 4, 2018    (DE) .......................... 102018107926.5

(51) Int. Cl.
*B28B 1/14*    (2006.01)
*C04B 14/48*    (2006.01)
(Continued)

(52) U.S. Cl.
CPC ............ *C04B 40/0082* (2013.01); *B28B 1/14* (2013.01); *B28B 1/523* (2013.01); *C04B 14/48* (2013.01);
(Continued)

(58) Field of Classification Search
CPC ... C04B 40/0082; C04B 14/48; C04B 20/006; C04B 20/008; C04B 28/02; C04B 30/02;
(Continued)

(56) References Cited

U.S. PATENT DOCUMENTS 5,858,082 A * 1/1999 Cruz ...................... E04C 5/012
106/644

FOREIGN PATENT DOCUMENTS

EP    0501879 A1 * 9/1992
JP    S59190251 A    10/1984
(Continued)

OTHER PUBLICATIONS

EP-0501879-A1, machine translation (Year: 1992).*
(Continued)

*Primary Examiner* — Kevin E Yoon
*Assistant Examiner* — Marites A Guino-O Uzzle
(74) *Attorney, Agent, or Firm* — Dinsmore & Shohl LLP

(57) ABSTRACT

A method is provided for producing a microfiber-reinforced high-strength concrete, comprising a cement matrix with a microfiber addition. The fiber elements have a shape-memory alloy. The method has at least the following steps: training a fiber shape of the fiber elements at a temperature above a transition temperature, wherein the fiber shape allows the fiber elements to latch; cooling the trained fiber elements; plastically deforming the fiber elements from the trained fiber shape into an intermediate form by means of which the fiber elements are prevented from latching; introducing the fiber elements into the cement matrix in order to
(Continued)

form a fresh concrete; and casting the fresh concrete and heating the fresh concrete to the transition temperature such that the fiber elements reform into the fiber shape, thereby latching the fiber elements. The invention additionally relates to a microfiber-reinforced concrete which is produced using such a method.

8 Claims, 1 Drawing Sheet

(51) Int. Cl.
  *C04B 20/00* (2006.01)
  *C04B 40/00* (2006.01)
  *B28B 1/52* (2006.01)
  *C04B 28/02* (2006.01)

(52) U.S. Cl.
  CPC .......... *C04B 20/006* (2013.01); *C04B 20/008* (2013.01); *C04B 28/02* (2013.01)

(58) Field of Classification Search
  CPC ......... C04B 40/02; C04B 14/34; C04B 32/02; C04B 20/00; C04B 40/00; C22C 38/00; C28C 38/58; B28B 1/14; B28B 1/523; B28B 11/24; B28B 23/04; E04B 1/58; E04B 1/09; E04B 1/08; E04C 5/02; E04C 5/08

See application file for complete search history.

(56) References Cited

FOREIGN PATENT DOCUMENTS

| | | | |
|---|---|---|---|
| JP | H0679714 A | * | 3/1994 |
| JP | H06079714 A | | 3/1994 |
| JP | 2004331491 A | | 11/2004 |
| JP | 2008008120 A | | 1/2008 |

OTHER PUBLICATIONS

JP-H0679714-A, machine translation (Year: 1994).*
International Search Report dated Jun. 27, 2019; International Application No. PCT/DE2019/100225.

* cited by examiner

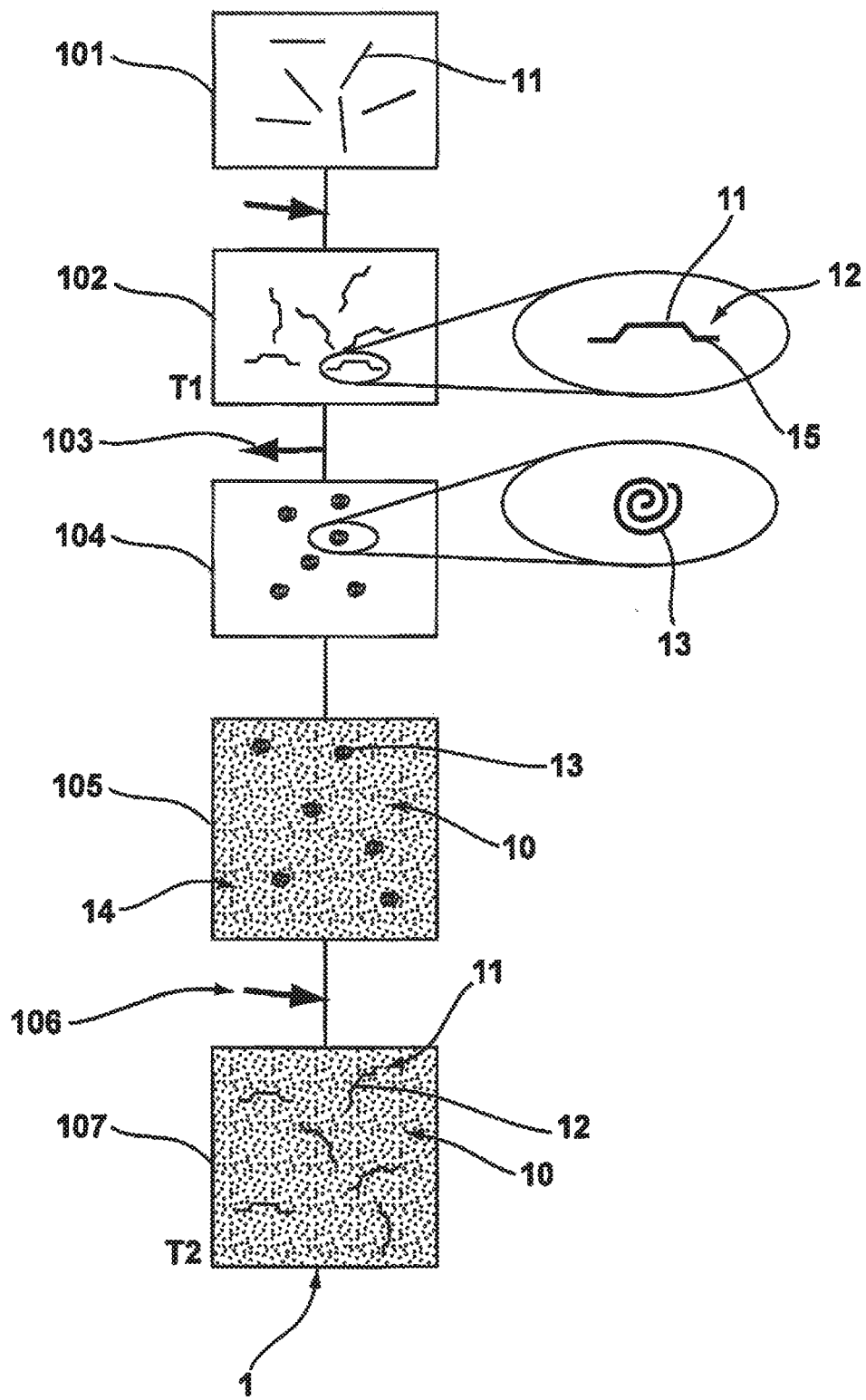

MICROFIBER-REINFORCED HIGH-STRENGTH CONCRETE

CROSS REFERENCE TO RELATED APPLICATIONS

This application is the U.S. national stage of PCT/DE2019/100225 filed Mar. 13, 2019, which claims priority of German patent application DE102018107926.5, filed Apr. 4, 2018, all of which are hereby incorporated by reference in their entirety.

FIELD OF THE INVENTION

The invention relates to a method of manufacturing a microfiber-reinforced concrete having a cement matrix in which a microfiber additive of fiber elements is introduced, wherein the fiber elements comprise a shape memory alloy. The invention is further directed to a microfiber-reinforced concrete that is manufactured using such a method.

BACKGROUND OF THE INVENTION

The combination of properties of a microfiber-reinforced concrete with rheological properties of a fiberless concrete is a central objective in modern construction. The use of microfibers is in particular advantageous, in some cases even indispensable, for ultra high performance concrete (UHPC). The already very good compressive strength values of the ultra high performance concrete can here additionally be combined with extremely high tensile strength values by the use of micro steel fibers. This makes the material of concrete usable for a large number of very filigree and thus weight saving construction designs and generally makes innovative constructions possible. It is known here that the connection between high strength steel fibers and the cement matrix is substantially improved by a fiber geometry. for example with end hooks of the fibers. Rheological properties of the concrete are, however, disadvantageously degraded. On a use of fiber elements having diameters of less than 1 mm with an addition in the range of less than 2 vol %, limitations in processibility have to be accepted. In this process, so-called balling occurs that describes an agglomeration of fiber elements. A considerably uneven distribution of the fiber elements in the cement matrix results from this so that an incomplete compaction of the concrete also results.

U.S. Pat. No. 5,858,082 A, for example, discloses a method of manufacturing a microfiber-reinforced concrete having a cement matrix in which a microfiber additive of fiber elements is introduced, wherein the fiber elements comprise a shape memory alloy. The shape memory effect of the shape memory alloy is used in this process such that the fiber elements interlock with one another and build up a prestressing in the cement matrix when the fresh concrete is heated to the transition temperature of the shape memory alloy. A microfiber-reinforced concrete is produced in this process that has a prestressed reinforcement of microfibers. The training here describes the imparting of a specific shape to the fiber elements that they remember again on a reaching of a so-called transition temperature, that is that they can adopt even if the fiber elements have been temporarily plastically deformed. The transition temperature here is typically considerably below the temperature at which the training of the memory shape of the fiber elements is performed, for example by means of a shaping method.

An improvement of the rheological properties using fiber elements introduced into the cement matrix cannot be implemented by the already known use of fiber elements composed of a shape memory alloy. It is in particular stated that the fiber elements should have a straight extent to process, in particular to cast, the concrete in this state of the fiber elements. Agglomeration of fiber bundles occurs particularly extensively in this process, whereby substantial inhomogeneities in the distribution of the fiber elements in the cement matrix occurs at higher volume proportions.

SUMMARY OF THE INVENTION

The object of the invention is the improvement of a method of manufacturing a microfiber-reinforced concrete, wherein the concrete should have a high proportion of fiber elements and the microfiber-reinforced concrete should additionally be able to be processed easily and a casting of the concrete should in particular be possible, without increased agglomeration of the fiber elements into fiber bundles occurring.

It is proposed in order to achieve the above object of the invention to perform the method of manufacturing a microfiber-reinforced concrete having the following steps: training a fiber shape of the fiber elements at a temperature above a transition temperature of the shape memory alloy, wherein the fiber shape should be designed such that an interlocking of the fiber elements with one another and/or with the cement matrix becomes possible. The method furthermore comprises the cooling of the trained fiber elements and there is subsequently a plastic deformation of the fiber elements from the trained fiber shape into an intermediate shape. The intermediate shape is selected such that an interlocking of the fiber elements is prevented by it. An introduction of the fiber elements into the cement matrix subsequently takes place to form a fresh cement that is subsequently cast without any interlocking of the fiber elements taking place. Finally, there is a heating of the fresh concrete to the transition temperature so that the fiber elements can revert back to the fiber shape with an interlocking of the fiber elements.

As a result, a microfiber-reinforced concrete can be produced that can be cast very easily and in which the proportion of fiber elements can be considerably increased. The effect of the considerably improved rheological properties, that is, for example, the casting ability of the microfiber-reinforced fresh concrete, is that the fiber elements are present in that intermediate shape during casting by which an interlocking of the fiber elements is prevented. The balling, that is the agglomeration of the fiber elements into fiber bundles, is thereby also considerably reduced and a microfiber-reinforced concrete that has a homogeneous distribution of the fiber elements is also provided with filigree molds. The possibility thus results of considerably increasing the strength values of the concrete, with a processibility of, for example, filigree structures also remaining possible despite the increased strength values of the concrete.

The training of the fiber shape of the fiber elements can take place, for example, at a temperature of 300° C. to 400° C., and in particular at a temperature of 340° C. to 360° C. The training of the fiber shape preferably takes place at a temperature of 350° C.

It is also of advantage that the fiber elements have a straight extent prior to the training of the fiber shape. The fiber elements can thus be provided in an inexpensive manner, for example in that the fiber elements are first provided in wire shape and are, for example, unwound from a coil and cut to length.

The training of the fiber shape takes place, for example, by a shaping of the fiber elements supplied in a straight shape into a fiber shape having slightly bent or bent over fiber ends. The process of shaping the fiber elements can take place in a uniform process with the cutting to length of the fiber elements from a continuous wire.

The method of training the fiber shape is performed in this process such that the fiber shape is in particular formed by the end hooks introduced to the fiber elements at the fiber ends. It can, for example, be sufficient here to provide the fiber ends with a kink, to bend it over, or to shape them as barbed hooks. The basic shape of the fiber shape here preferably maintains an elongate extent to maintain the effect of the reinforcement.

To form the intermediate shape from the trained fiber shape, the fiber elements are, for example, converted into a compacted form and the compacted form has to be designed such that an interlocking of the fiber elements among one another and an interlocking of the fiber elements with the cement matrix is no longer possible. The compacted form can, for example, comprise a curled shape, a wavy or twisted shape or the intermediate shape has a wound shape, whereby an interlocking of the fiber element is prevented. The wound shape or ball shape can in particular be designed such that the ends of the fiber elements in a ball or a curl, a winding, or another compacted shape face inwardly. The fiber elements can thereby move toward one another in their intermediate shape without interlocking with one another or forming a form fit with one another in another manner and agglomerating. The rheology of the fresh concrete in the castable state is significantly improved as a consequence of the non-interlocking of the fiber elements since no agglomeration of fiber elements can form. If the fresh concrete is subsequently heated to the transition temperature again with the fiber elements in the intermediate shape in the processed, that is, for example, cast, state, the fiber elements lose their intermediate shape again and remember the trained fiber shape that the desired end hooks have in that the fiber elements again remember the trained shape. A form fit effect of the fiber elements among one another and of the fiber elements with the cement matrix is thus established again, which only takes place after establishing the desired cast shape of the component from the microfiber-reinforced concrete.

The transition temperature can, for example, have a value of 40° C. to 50° C. The level of the transition temperature here in particular depends on the material of the shape memory alloy. In this process, not only the fiber elements, but also the total cement matrix are heated to the transition temperature so that an improved and accelerated hardening of the concrete simultaneously results with the return of the fiber elements from the intermediate shape into the trained shape.

A special advantage is achieved if the fiber elements are not added into the cement matrix at more than 2 vol %. In this respect, the fiber elements can, for example, have a length of 5 mm to 50 mm, preferably 10 mm, and/or can be added into the cement matrix with a diameter of 0.1 mm to 2 mm. The fiber elements here do not have to have a circular cross-section and can, for example, also have a rectangular cross-section or even an undefined cross-section. The geometrical dimensions of the fiber elements here in particular depend on the geometry to be produced for the component that is to be manufactured using the microfiber-reinforced concrete.

The invention is further directed to a microfiber-reinforced concrete that has been manufactured using the method in accordance with the invention. In this respect, the fiber elements can have a shape memory alloy comprising a copper and/or iron base. It is also of advantage for the fiber elements to be interlocked with one another and/or with the cement matrix in the hardened concrete, in particular by end hooks introduced into the fiber elements.

PREFERRED EMBODIMENT OF THE INVENTION

Further measures improving the invention will be shown in more detail below together with the description of a preferred embodiment of the invention with reference to the only FIGURE. There is shown:

The FIGURE is a schematic sequence of the steps of the method in accordance with the invention of manufacturing a microfiber-reinforced concrete.

DETAILED DESCRIPTION OF THE DRAWING

The FIGURE shows a sequence of a plurality of method steps 101 to 107 that describe a method in accordance with the invention of manufacturing a microfiber-reinforced concrete 1.

The method begins with the provision 101 of fiber elements 11 and the heating of the fiber elements 11 to a temperature above a transition temperature. The transition temperature of the fiber elements 11 from a shape memory alloy is the temperature above which the shape memory alloy remembers an originally trained geometrical shape in that the component composed of the shape memory alloy returns into this remembered shape.

The next step of the method in accordance with the invention is formed by a training 102 into a fiber shape, with the fiber elements 11, for example, being changed by a shaping process or by another plastic deformation process into the desired shape that should be remembered by the shape memory alloy on a reaching of the transition temperature. In a further step, the cooling 103 of the trained fiber elements 11 from a temperature T1 subsequently takes place to train the fiber shape to a room temperature, for example.

In a further step 104, a plastic deformation of the fiber elements takes place into an intermediate shape 13 that is formed such that an interlocking of the fiber elements among one another and also with a cement matrix is suppressed.

The introduction 105 of the fiber elements to the intermediate shape 13 into the cement matrix 10 and the casting of the fresh concrete follows this. Once the fresh concrete has been cast, the heating 106 of the fresh concrete to a transition temperature T2 takes place so that the obtaining 107 of the microfiber-reinforced subsequently takes place. In method step 107, the fiber elements 11 are again present in the trained shape for the casting of the concrete so that the strength enhancing effect of the fiber elements 11 in the cement matrix 10 can be fully exploited despite a simple preceding casting of the fresh concrete.

The fiber elements 11 that have a rod shape are shown in step 101 here. A heating by a heat input, shown by an arrow, to, for example, a temperature of 350° C. takes place from step 101 to step 102. The shaping of the fiber elements 11 into a fiber shape 12 in which they have end hooks 15 of the fiber elements 11 forming a form fit takes place in step 102.

Following step 102, the cooling 103 takes place from the temperature T1 for training the fiber shape 12, for example back to room temperature.

A curled shape of the fiber elements that corresponds to the intermediate shape 13 is shown in step 104. The fiber elements 11 in the intermediate shape 13 are introduced into the cement matrix 10 in step 105, whereby the fresh concrete 14 is provided. The heating to the temperature T2, that describes the transition temperature, subsequently takes place so that the curled intermediate shape 13 of the fiber elements 11 return from step 105 into the fiber shape 12 that was originally trained in step 102.

A substantially larger number of fiber elements 11 per volume unit of the cement matrix 10 can be introduced in the microfiber-reinforced concrete 1, whereby the tensile and/or compressive strength of the microfiber-reinforced concrete 1 is considerably increased. The proportion of the fiber elements 11 in the cement matrix 10 is, for example, considerably above 2 vol %, with the rheological properties of the concrete 1 for processing being promoted despite the increased fiber proportion since the rheological step of casting the fresh concrete takes place with fiber elements 11 that are present in the intermediate shape 13.

The invention is not restricted in its design to the preferred embodiment specified above. A number of variants is rather conceivable that also makes use of the solution shown with generally differently designed embodiments. All the features and/or advantages, including any construction details or spatial arrangements, originating from the claims, the description, or the drawings can be essential to the invention both per se and in the most varied combinations.

REFERENCE NUMERAL LIST

1 microfiber-reinforced concrete
10 cement matrix
11 fiber element
12 fiber shape
13 intermediate shape
14 fresh concrete
15 end hook
101 providing fiber elements and heating the fiber elements to a temperature above a transition temperature
102 training a fiber shape
103 cooling the trained fiber elements
104 plastic deformation of the fiber elements
105 introducing the fiber elements into the cement matrix and casting of the fresh concrete
106 heating the fresh concrete to a transition temperature
107 obtaining a microfiber-reinforced concrete
T1 temperature to train a fiber shape
T2 transition temperature

The invention claimed is:

1. A method of manufacturing a microfiber-reinforced concrete comprising a cement matrix in which a microfiber additive of fiber elements is introduced and wherein the fiber elements have a shape memory alloy, with the method comprising at least the following steps:
   training a fiber shape of the fiber elements at a temperature above a transition temperature, with the fiber shape making an interlocking of the fiber elements possible;
   cooling the trained fiber elements;
   plastic deformation of the fiber elements from the trained fiber shape into an intermediate shape by which an interlocking of the fiber elements is prevented, wherein, to form the intermediate shape, the fiber elements are brought into a compacted form;
   the compacted form further comprises a curled form, a ball form, or a wound form, whereby an interlocking of the fiber elements is prevented;
   introducing the fiber elements into the cement matrix to form a fresh concrete;
   casting the fresh concrete; and
   heating the fresh concrete to the transition temperature so that the fiber elements return to the fiber shape while interlocking the fiber elements.

2. The method in accordance with claim 1, wherein the training of the fiber shape of the fiber elements takes place at a temperature of 300° C. to 400° C. and/or at a temperature of 340° C. to 360° C.

3. The method in accordance with claim 1, wherein the fiber elements have a straight extent prior to the training of the fiber shape.

4. The method in accordance with claim 1, wherein the training of the fiber shape is performed by means of a shaping of the fiber elements supplied in a straight shape.

5. The method in accordance with claim 4, wherein the trained fiber shape is at least formed by end hooks shaped into the fiber elements at the fiber ends.

6. The method in accordance with claim 1, wherein the transition temperature is selected at a value of 40° C. to 50° C.

7. The method in accordance with claim 1, wherein the fiber elements are introduced into the cement matrix at more than 2 vol %.

8. The method in accordance with claim 1, wherein the fiber elements are added into the cement matrix with a length of 5 mm to 50 mm and/or with a diameter of 0.1 mm to 2 mm.

* * * * *